United States Patent [19]

Hein

[11] Patent Number: 5,224,790
[45] Date of Patent: Jul. 6, 1993

[54] STABILIZER BAR SLIP BUSHING WITH AXIAL RESTRAINT

[75] Inventor: Richard D. Hein, Wabash, Ind.

[73] Assignee: GenCorp Inc., Fairlawn, Ohio

[21] Appl. No.: 817,719

[22] Filed: Jan. 7, 1992

[51] Int. Cl.$^5$ .................................................. F16D 3/00
[52] U.S. Cl. .................................... 403/225; 403/222;
384/192; 384/215; 280/689; 280/726;
267/140.3
[58] Field of Search ........................... 403/224–228,
403/130, 131, 133, 222, 122, 132, 135, 141, 143,
221, 223; 280/689–716, 723, 725, 726; 384/192,
202, 203, 215, 220; 267/141, 140.3

[56] References Cited

U.S. PATENT DOCUMENTS

| | | | |
|---|---|---|---|
| 2,717,792 | 9/1955 | Pelley | 403/122 X |
| 2,993,715 | 7/1961 | Hutton | 403/224 |
| 3,030,132 | 4/1962 | Compton | 403/226 X |
| 3,055,687 | 9/1962 | Hutton | 403/221 |
| 3,315,952 | 4/1987 | Vittone | 280/89 X |
| 3,501,184 | 3/1970 | Van Winsen et al. | 403/133 |
| 3,801,209 | 4/1974 | Matsuoka | 403/225 |
| 4,026,657 | 5/1977 | Chmura | 403/122 |
| 4,111,499 | 9/1978 | McCloskey | 384/192 |
| 4,129,394 | 12/1978 | Eichinger et al. | 403/226 X |
| 4,327,995 | 5/1982 | Stewart | 403/224 |
| 4,854,766 | 8/1989 | Hein | 403/224 |
| 4,914,777 | 4/1990 | Cartellone | 403/135 X |

FOREIGN PATENT DOCUMENTS

| | | | |
|---|---|---|---|
| 126415 | 5/1989 | Japan | 403/132 |
| 777002 | 6/1957 | United Kingdom | 403/132 |

Primary Examiner—Randolph A. Reese
Assistant Examiner—Harry C. Kim

[57] ABSTRACT

A mount assembly is described for resiliently mounting a stabilizer bar on an automobile frame. The mount assembly comprises a bracket assembly and a bushing assembly. The bushing assembly includes an outer sleeve adjacent to the bracket and an inner sleeve for contacting the stabilizer bar. The nesting sleeves are designed so as to provide restraint of axial movement while allowing ease of rotational movement. The restraint can be provided by a positive stop such as a projecting flange member, or by cooperating conical or tapered surfaces which defines an increased frictional engagement and compression of the stabilizer bar as the inner sleeve and the outer sleeve move increasingly out of relative axial alignment.

14 Claims, 1 Drawing Sheet

STABILIZER BAR SLIP BUSHING WITH AXIAL RESTRAINT

FIELD OF THE INVENTION

The invention relates to mount assemblies, especially mount assemblies with slip bushings that are used to mount metal stabilizer bars to automobile frames. Such mount assemblies are generally comprised of a shaped metal attachment bracket which holds a split annular rubber bushing in compressive engagement with the stabilizer bar when the mount assembly and the stabilizer bar are properly secured to the automobile frame. The rubber bushing may be separate or may be integrally molded to the inside of the bracket member of the assembly.

BACKGROUND OF THE INVENTION

In the past, relative movement between the metal stabilizer bar and the rubber bushing has lead to an annoying squeaking noise when the automobile is in use. Several solutions were devised to reduce or eliminate the noise problem. One solution was to provide a surface on the bushing which has a low coefficient of friction such as polymers of polytetraflouroethylene. However, this solution presented problems with expense, and durability.

An alternative solution is presented in Hein U.S. Pat. No. 4,854,766 which is incorporated by reference as if fully set forth herein. In this solution, the mount assembly has an elastomeric inner sleeve which is separately mounted around the sway bar and which contacts an outer sleeve. Either the outer surface of the inner sleeve, or the inner surface of the outer sleeve, or both, are provided with a low friction surface so that any slippage caused by movement between the mount assemblies and the bar occurs between the elastomeric materials in radially spaced relation away from the bar.

In accordance with the present invention, a bushing assembly is provided and it includes means to shift the interface of slippage to the interface between the inner sleeve and the innerliner(i.e. outer sleeve). Specifically, the bushing assembly permits ease of rotational movement. However, the present invention also provides means to limit axial slippage. In particular, the means to inhibit the slippage provides mating surfaces so that there is an increased coefficient of friction between the surfaces as the two members slip further out of axial alignment. In particular these surfaces can be provided by either a flange which inhibits axial movement beyond a certain distance or these surfaces can be provided by mating conical surfaces or both. Thus, the present invention inhibits the inner sleeve from becoming disengaged from the innerliner (outer sleeve).

In addition, the present invention eliminates one of the longitudinal slits in either the inner sleeve or the outer sleeve.

Thus, the present design eliminates the potential presented by the prior art design for the slits in the inner sleeve and the outer sleeve to catch if these two slits should become aligned.

Moreover, the invention accomplishes the foregoing objectives while providing a mount assembly that is relatively simple to assemble and is economical.

SUMMARY OF THE DRAWINGS

The following description of the invention will be better understood by reference to the accompanying drawings, wherein.

DETAILED DESCRIPTION OF THE INVENTION

Figures 1, 2:
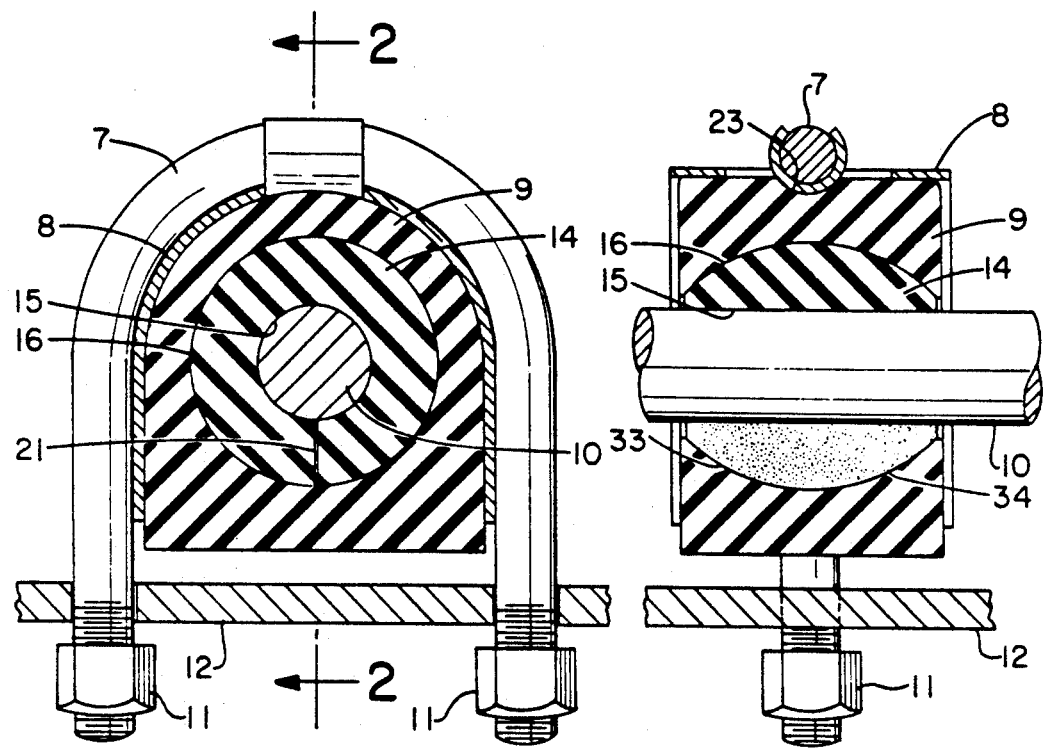
FIG. 1 is a frontal elevation in partial cross-section of a stabilizer bar mount assembly in accordance with the invention.
FIG. 2 is a side elevation, in partial cross-section, as may be taken at line 2—2 of FIG. 1 of the stabilizer bar mount assembly in accordance with a first embodiment of the invention.

With particular reference to the drawings, a stabilizer bar mount assembly is shown which comprises a shaped clamp member in juxtaposition to a matingly configured metal bracket 8 which is sandwiched between the clamp member 7 and an outer sleeve 9. The outer sleeve 9 surrounds or at least partially surrounds and engages an inner sleeve 14. While this member is termed a sleeve, it should be understood that to the extent that an arcuate or otherwise incomplete member may function in the capacity intended, such designs are included herein under the use of the term "sleeve." The inner sleeve 14 is designed to surround and engage a metal stabilizer 10. While the stabilizer bar (and correspondingly the inner surface of the inner sleeve) is generally shown as being a circular cross-section, it should be understood that the cross-section may be otherwise, including, for example, square, rectangular, triangular, or oval.

In fact, the engagement of the stabilizer bar by the inner sleeve is preferably designed so as to inhibit axial movement of the stabilizer bar relative to the inner sleeve. Therefore, it may be desirable that the inner diameter of the inner sleeve includes a high friction surface, such as knurling, or even an adhesive engagement of the stabilizer bar. The inner sleeve 14 includes a longitudinal slit 21 to permit assembly of the inner sleeve on the stabilizer bar 10.

The clamp member 7 is attached to an automobile frame 12 such as by nuts 11. The outer sleeve 10 includes an annular depression 23 which is engaged by a corresponding depression in the bracket member 8. The nuts 11 can be tightened to tighten the clamp member and cause compressive engagement of the bracket with the outer sleeve. This inhibits axial movement of the mount assembly relative to the automobile and further of the stabilizer bar relative to the automobile.

The outer sleeve 9 is comprised of a suitable material, such as EPDM rubber or copolymers of EPDM or other suitable elastomers such as styrene, butadiene rubbers, or natural rubbers, or the like. The outer sleeve 9 preferably has no longitudinal slit but is made from a material which is flexible enough to allow the inner sleeve to be inserted into the outer sleeve. A suitable durometer is from about 40 to about 80 with a preferable range being from about 40 to about 60. The inner sleeve 14 is comprised of a similar material with a preferable material being EPDM rubber or an EPDM copolymer with a durometer of from about 50 to about 80, for both embodiments. In general, it is preferable that the inner sleeve 14 have a durometer than the outer sleeve 9. In the first embodiment, the outer sleeve requires the flexibility in order to permit assembly without the longitudinal slit. Generally, the outer sleeve is soft enough to facilitate insertion of the expanded "eye"-portion of the stabilizer bar.

The inner sleeve 14 includes a longitudinal slit to permit the sleeve to be mounted on the stabilizer bar prior to the placement of the outer sleeve 9 over the end of the stabilizer bar and onto the inner sleeve. The bracket and clamp assembly is then positioned over the outer sleeve and bolted in place on the automobile frame.

The interface of slippage is shifted between the mount assembly and the stabilizer bar away from the unfriendly metallic surface of the sway bar. This is accomplished by increasing the frictional engagement between the stabilizer bar 10 and the inner sleeve 14 and decreasing the frictional engagement between the outer sleeve 9 and the inner sleeve 14, so that the difference between the two will be sufficient to shift the interface of slippage away from the metal-to-elastomer interface of the sway bar and sleeve to the elastomer to elastomer interface of the outer sleeve and the inner sleeve. Accordingly, the inner cylindrical surface 15 of the inner sleeve 14 which contacts the stabilizer bar 10 is molded or extruded with knurls or serrations to provide a rough inner surface with a high coefficient of friction. Alternatively, the inner sleeve may be provided with a inner surface having a high degree of tack or the inner sleeve may even be adhered to the sway bar.

The outer surface 16 of the inner sleeve 14 which contacts the outer sleeve is treated in an opposite manner, i.e. it is coated with a suitable material which has a low coefficient of friction and good wear characteristics (that is, a material which has a lubricating effect.) Suitable materials include polytetrafluoroethylene, or silicone or the like. As a result, the difference in the coefficients of friction of the two interfaces will be substantial and sufficient to cause slippage between the bushing and stabilizer bar to occur at the interface of the two sleeves. Of course it should be seen as an equivalent possibility to coat the inner surface of the outer sleeve with a suitable material having a low coefficient of friction.

The exact compositions of the sleeves and of the coatings will depend to some extent on the application, for example whether the mount assemblies are used on small passenger vehicles or large heavy trucks. In any case it is necessary to shift the interface of slippage between the clamp and the sway bar.

Further, in accordance with the mount assembly of the present invention, while free rotation is encouraged, means are provided to inhibit the extent of axial slippage between the members of the stabilizer bar mount assembly. Under normal driving conditions, the stabilizer bar (and inner sleeve) should experience free torsional movement relative to the bracket member. Smooth radial rotation permits quiet, efficient, and longer lasting operation. However, in the event of a sharp action, it is desirable to permit a limited amount of axial movement of the stabilizer bar and inner sleeve relative to the outer sleeve and clamp member. The present design inhibits the axial misalignment of the stabilizer bar from the clamp and further serves to tighten the engagement of the clamp upon the sway bar in response to sudden axial forces. In a preferred embodiment the resistance to axial slip is increased relative to the distance of misalignment by a mating interface of the inner and outer sleeves. Further, this increases the engagement or grip of the inner sleeve on the stabilizer bar as the axial misalignment increases.

The means to accomplish the foregoing result include either a positive stop, such as an eared flange on the outer sleeve axially exterior to or otherwise matingly configured with the inner sleeve (or vice versa); or a mating conical interface which provides for an increasingly tighter engagement of the surfaces of the inner and the outer sleeve as the distance of axial misalignment increases. It may even be desirable to include both means to limit the amount of axial slip.

Figures 3, 4:
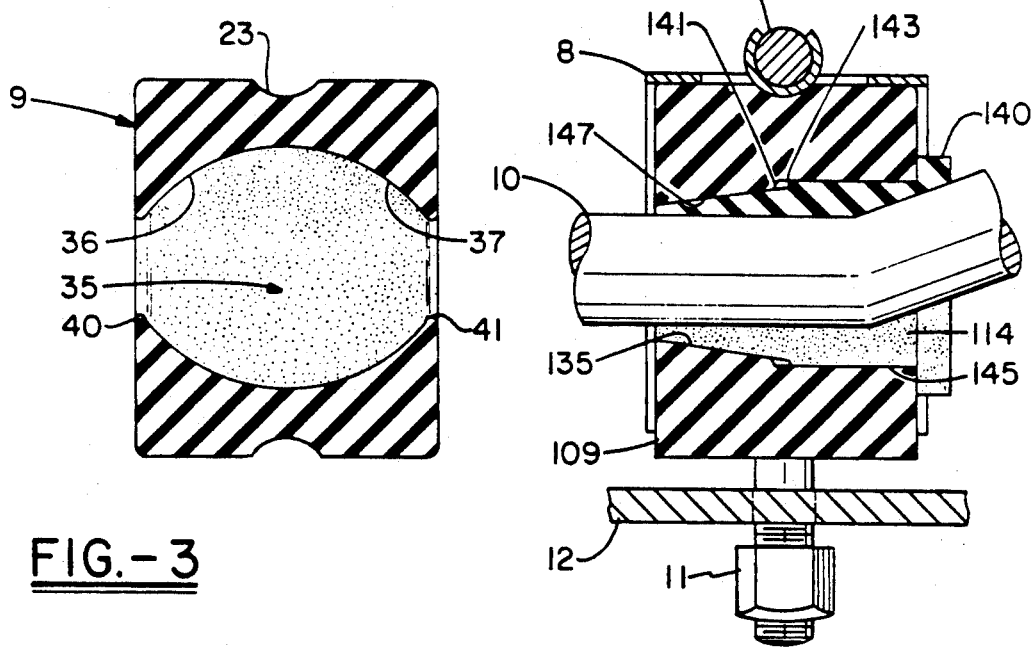
FIG. 3 is a top view in axial cross-section, of an outer sleeve in accordance with a first embodiment of the invention.
FIG. 4 is a side elevation, in partial cross-section, similar to FIG. 2 of the stabilizer bar mount assembly in accordance with a second embodiment of the invention.

A first embodiment is shown is in FIGS. 2 and 3 in which the inner sleeve 14 has a barrel-shape, i.e. a first portion of increasing radius 33 and a second portion of decreasing radius 34. The mating surface of the hollow 35 within outer sleeve has a corresponding first portion of increasing radius 36 and a second portion of decreasing radius 37. Thus, it can be seen how the engagement is tightened as the sway bar and inner sleeve are moved axially relative to the bracket member 8. In addition, the outer sleeve 14 includes internally projecting annular flanges 40,41 at either terminus of the hollow 35. These flanges also serve to inhibit the axial slippage of the stabilizer bar and inner sleeve relative to the remainder of the clamp assembly.

In an alternative embodiment shown in FIG. 4, the inner sleeve 114 has a conical surface which expands in one direction only and the hollow 135 of the outer sleeve 109 has a corresponding mating configuration which expand radially along the longitudinal axis. In this instance, the inner sleeve includes a radially outward projecting annular flange at the terminus having the larger radius. This flange 140 serves to inhibit axial movement of the stabilizer bar relative to the clamp assembly. In this embodiment, a directional restraint is provided by aligning the top end of the bushing in opposite directions. Opposing annular shoulders 141, 143 provided to leave clearance for axial movement and to inhibit the cylindrical section of the inner sleeve 145 from engaging the conical section of the outer sleeve 147.

Thus, there has been described a stabilizer bar clamp with a unique bushing which allows free radial rotation but in which axial slip is limited. This bushing eliminates the squeaking noise, and increases the durability and efficiency of the stabilizer bar mount assembly while it provides greater safety and reduces the potential for the stabilizer bar and mount assembly to misalign under unusual conditions.

While in accordance with the Patent Statutes, the best mode and preferred embodiment has been set forth, the scope of the invention is not limited thereto, but rather by the scope of the attached claims.

What is claimed is:

1. A mount assembly for resiliently coupling a first metal structural member to a second metal structural member, each of which has an outer surface, comprising:
   (a) an elastomeric outer sleeve having inner and outer surfaces, and having a hollow which is designed to at least partially surround the outer surface of the first metal member;
   (b) means coacting between the outer sleeve and the first metal member for providing an interface of slippage between the mount assembly and the first metal member away from the surface of the first metal member, said interface being at the inner surface of the outer sleeve closest the first metal member, the means including:
a hollow elastomeric inner sleeve having inner and outer surfaces and which is separate from and radially and axially movable from an aligned to an axially misaligned position relative to the outer sleeve and which at least partially surrounds the first metal member and is interspersed between the first metal member and the outer sleeve, and means coacting with the inner sleeve for decreasing frictional engagement between the inner sleeve and the outer sleeve to a level which permits free rotational movement of the first metal member relative to the outer sleeve and which is substantially lower than the frictional engagement between the inner sleeve and the first metal member;
(c) means limiting axial movement between the inner sleeve and the outer sleeve, the limiting means providing increased resistance to axial movement as the relative distance of misalignment is increased; and
(d) means for attaching the mount assembly to the second metal structural member.

2. The mount assembly as set forth in claim 1 wherein the friction decreasing means comprises a low friction coating on the inner surface of the outer sleeve or on the outer surface of the inner sleeve.

3. The mount assembly as set forth in claim 2 wherein the low friction coating comprises polytetrafluoroethylene or silicone.

4. The mount assembly as set forth in claim 1 wherein the means limiting axial movement comprises internally projecting annular flanges at each terminus of the hollow of the outer sleeve.

5. The mount assembly as set forth in claim 1 wherein the means limiting axial movement comprises a circumferential annular flange projecting radially outward from the outer surface of the inner sleeve.

6. The mount assembly as set forth in claim 1 wherein the means limiting the range of axial movement comprises mating surfaces comprising the outer surface of the inner sleeve and the inner surface of the outer sleeve, said surfaces having an increasingly tighter cooperation as the inner and outer sleeve move out longitudinally out of axial alignment.

7. The mount assembly as set forth in claim 6, wherein said inner sleeve has a longitudinal axis and the outer surface of the inner sleeve has a generally increasing circumference along the longitudinal axis.

8. The mount assembly as set forth in claim 6, wherein said inner sleeve has a longitudinal axis and the inner surface of the hollow within the outer sleeve has a generally increasing circumference along the longitudinal axis.

9. The mount assembly as set forth in claim 6, wherein said inner sleeve has a fist longitudinal axis and wherein said hollow has a second longitudinal axis and the outer surface of the inner sleeve has a generally increasing circumference along the first longitudinal axis and the inner surface of the hollow within the outer sleeve has a generally increasing circumference along the second longitudinal axis.

10. The mount assembly as set forth in claim 1, wherein said inner sleeve has a longitudinal axis and said means limits axial movement in two directions along the longitudinal axis of the first metal member.

11. The mount assembly as set forth in claim 6, wherein said elastomeric outer sleeve is substantially free from any longitudinal slit.

12. A mount assembly for resiliently coupling a first metal structural member to a second metal structural member, each of which has an outer surface, comprising:
(a) an elastomeric outer sleeve having inner and outer surfaces, and which is designed to at least partially surround the outer surface of the first metal member and which is substantially free from any longitudinal slit;
(b) means coacting between the outer sleeve and the first metal member for providing an interface of slippage between the mount assembly and the first metal member away from the metallic surface of the first metal member to the inner cylindrical surface of the outer sleeve closest the first metal member, the means including a hollow elastomeric inner sleeve having inner and outer surfaces and which is separate from and radially and axially movable from an aligned to an axially misaligned position relative to the outer sleeve and which at least partially surrounds the first metal member and is interspersed between the first metal member and the outer sleeve, and means coacting with the inner sleeve for decreasing frictional engagement between the inner sleeve and the outer sleeve to a level which permits free rotational movement of the first metal member relative to the outer sleeve and which is substantially lower than the frictional engagement between the inner sleeve and the first metal member;
(c) means limiting axial movement between the inner sleeve and the outer sleeve, the limiting means providing increased resistance to axial movement as the relative distance of misalignment is increased; and
(d) means for attaching the mount assembly to said second metal member.

13. A mount assembly as set forth in claim 12 wherein said outer sleeve is comprised of a material which is sufficiently flexible to allow said inner sleeve to be inserted therein.

14. A mount assembly as set forth in claim 13 wherein said outer sleeve has a durometer of from about 40 to about 80, and said inner sleeve has a durometer of from about 50 to about 80.

* * * * *